July 16, 1940.  F. H. HOLZ  2,208,074
HYDRAULIC BRAKE
Filed Sept. 11, 1939  2 Sheets-Sheet 1
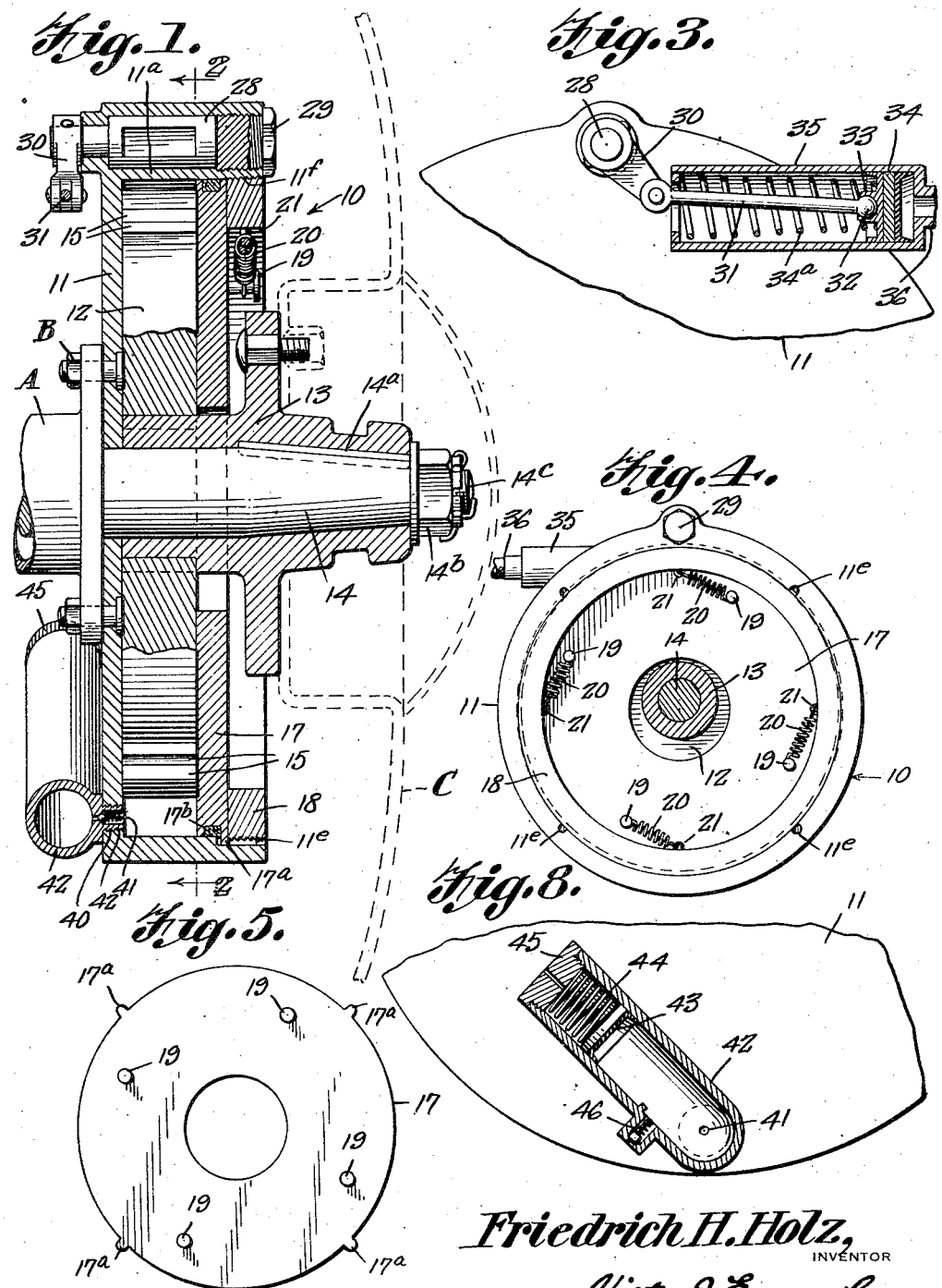
Friedrich H. Holz,
INVENTOR July 16, 1940. F. H. HOLZ 2,208,074
HYDRAULIC BRAKE
Filed Sept. 11, 1939 2 Sheets-Sheet 2
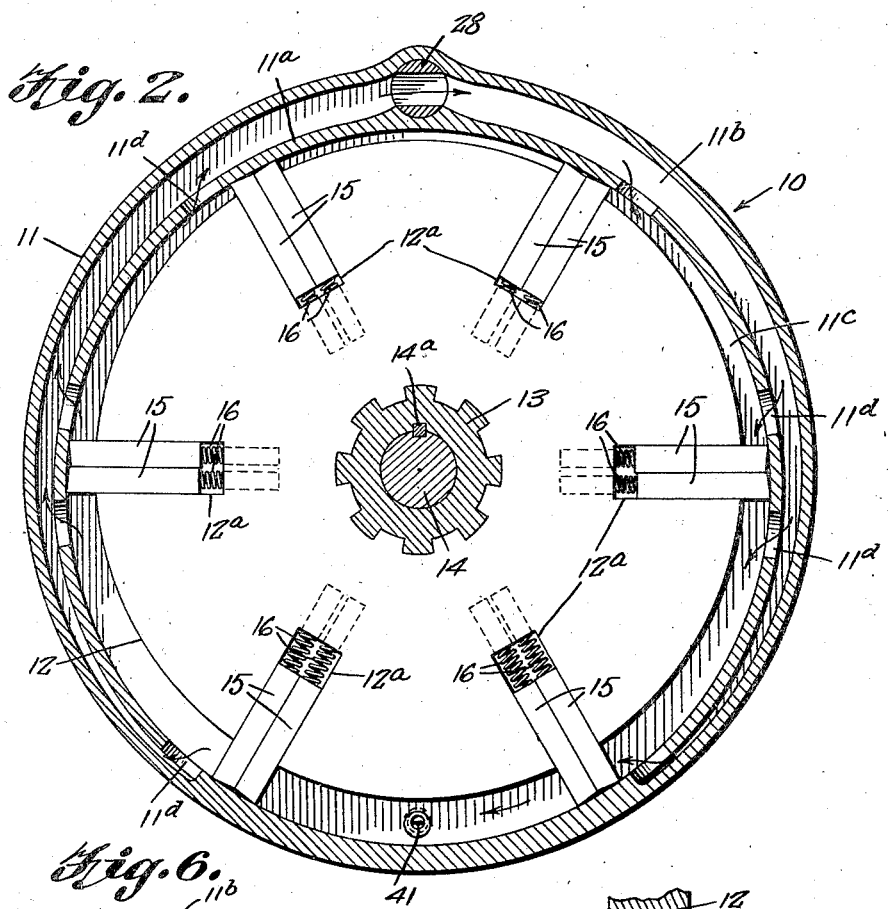
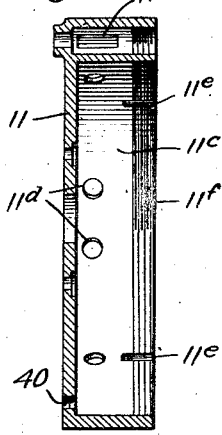
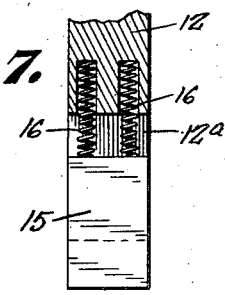
Friedrich H. Holz,
INVENTOR Patented July 16, 1940

2,208,074

UNITED STATES PATENT OFFICE 2,208,074

HYDRAULIC BRAKE

Friedrich H. Holz, Salt Lake City, Utah

Application September 11, 1939, Serial No. 294,364

5 Claims. (Cl. 188—90)

This invention relates to improvements in braking systems and especially is concerned with a novel improved brake of the rotary pump type which includes means for compensating for wear of parts.

One of the disadvantages of existing types of brakes, especially in brakes of the hydraulic type, is that during normal use wear of parts not infrequently is such as to permit leakage of the hydraulic fluid, therefore substantially reducing the efficiency of the brake.

It is an object of the present invention to provide a novel brake of the rotary pump type wherein means are provided for compensating for wear of internal parts of the brake, especially parts the wear of which would permit leakage of the hydraulic fluid with impairment of the efficiency of the brake.

Another object of the present invention is to provide a novel braking system including brake elements of the rotary pump type which can be remotely controlled and operated by conventional hydraulic brake systems.

An advantage of the novel braking system according to this invention over existing similar systems is that the novel brake casing according to this invention not only compensates for wear of internal parts of the brake, but also facilitates dismantling of the brake for adjustment or repair.

A feature of the brake elements comprising the braking system according to the present invention is their comparative structural simplicity whereby the brake is well suited to the requirements of mass production with resulting economies of manufacture.

Another feature is that elements of the brake made in the practice of the present invention can be replaced or interchanged without impairment of the brake efficiency whereas in many existing types of hydraulic brakes which the present invention constitutes an improvement, parts may not be interchanged without substantially and deleteriously affecting the utility of the brake.

Other objects, advantages and features of the new and improved hydraulic brake according to the present invention will be apparent to those skilled in this art during the course of the following description.

Regarded in certain of its broader aspects, the novel braking system according to the instant invention comprises a brake element of the rotary pump type comprising a rotor mounted within a casing, the space between the casing sides, the periphery of the rotor and the casing both constituting a pumping chamber; the improved casing including means compensating for wear whereby the rotor is continuously pressed between the casing sides, said casing means comprising a cupular first casing element within which the rotor is received, a second casing element freely axially slidable within said first casing element, an annulus superposed on said second casing element engaging with parts of said casing element whereby rotation of said annulus can press said second casing element within said first casing element, and continuously operating means tending to rotate said annulus. In certain other aspects the instant invention comprises a brake element of the rotary pump type provided with a casing having an eccentrically mounted rotor journalled therein, the space between the periphery of the rotor and the bore of the casing constituting a pumping chamber having an inlet and an outlet orifice, radially extending sliding vanes carried by said rotor extending through said chamber and engaging the bore of said casing, and a remotely hydraulically controlled valve connecting and controlling fluid flow between said inlet and said outlet orifice.

In order to facilitate a fuller and more complete understanding of the present invention a specific embodiment thereof herein illustrated will be hereinafter described, it being clearly understood, however, that the illustrated embodiment, although presently preferred, is provided solely by way of example of the practice of this invention and not by way of limitation thereof except insofar as the invention is recited in the subjoined claims.

Referring then to the drawings,

Figure 1 is substantially a vertical sectional view of the presently preferred embodiment of this invention showing same mounted for use upon parts of a conventional vehicle, Fig. 2 is substantially a vertical sectional view of Fig. 1 taken along the line 2—2, Fig. 3 is a detail view mostly in vertical section illustrating parts of the brake operating mechanism, Fig. 4 is a front elevational view of the presently preferred embodiment of this invention, Fig. 5 is a plan view of one of the casing elements, Fig. 6 is a vertical sectional view of another casing element, Fig. 7 is substantially a side elevational view of one of the spring pressed vanes carried by the rotor, and Fig. 8 is a detail view mostly in vertical section of the pump filling means.

Referring now to the drawings, it will be noted that the brake generally designated by the numeral 10 comprises an essentially flat cupular casing element 11 open at one end and internally divided by a partition 11a which serves as a common wall for the crescent shaped chamber 11b and for the essentially circular chamber 11c within the casing substantially as shown in Fig. 2. Bores 11d are provided in the partition 11a for permitting communication between the chambers for purposes which hereinafter will be made more clear. Internal marginal portions of the chamber 11c are provided with transversely extending keyways 11e which intersect internally threaded portions 11f of the casing end substantially as is shown in Fig. 6.

A disc-shaped rotor 12 carried on the splined hub 13 which in turn is mounted upon the axle end portion 14 by means including the key 14a and the nut 14b received on threaded end portions 14c of the axle. The rotor 12 is provided with a plurality of angularly spaced radially extending slots 12a within which are received pairs of sliding vanes 15 urged outwardly by springs 16 pressed against end parts of the vanes and parts of the rotor. It is to be noted that the distal end portions of the vanes 15 are beveled whereby each pair of vanes presents a V-shaped surface pressed against the bore of the casing chamber 11c.

A disc-like casing element 17 having radially extending key formations 17a on marginal portions thereof receivable in and engageable with the key ways 11e of the casing element 11 is positionable within said casing element 11 against the rotor 12 essentially as shown in Fig. 1. It is to be noted that the periphery of the casing element 17 is provided with a gland 17b for preventing or at least inhibiting leakage of the hydraulic fluid. It will be evident of course that the interengagement of the key 17a with the key ways 11e serves to prevent relative rotation of the casing elements 11 and 17 and it is further to be noted that when the casing element 17 is pressed against the side of the rotor 12, the space between the periphery of the rotor, the bore of the casing chamber 11c and the inner sides of the casing defines a pumping chamber.

The novel means for pressing the rotor between the casing sides will now be described, reference being made especially to Figs. 1, 4 and 5 wherein the numeral 18 designates an externally threaded annulus receivable in and engageable with the threaded end portion 11f of the casing 11. When the annulus is positioned upon the casing element 17 above described, it will be apparent that rotation of the annulus advancing same along the threaded portions of the casing element will press the casing element 17 within the casing element 11 whereby the rotor can be firmly but rotatably pressed between the casing sides. Posts 19 mounted on the outside face of the casing element 17 are attached to spring tensioning means 20 mounted by hasps 21 on parts of the annulus 18 whereby the spring tensioning means tend continuously to rotate the annulus 18 thereby advancing same along the threaded end portion 11f above mentioned and pressing the rotor between the casing sides. It will be apparent from the foregoing that when the rotor, as illustrated in Fig. 2, is rotated in a clockwise direction, fluid will pass through the pumping chamber 11c and openings 11d to and from the crescent shaped chamber 11b substantially as indicated by the arrows on the drawings. It is especially to be observed that the course of fluid through the crescent shaped chamber 11b is from tip to tip inasmuch as the openings 11d are provided in the locality of the chamber nearest the tips. It will be apparent to those skilled in this art that interruption of the course of flow of fluid through the crescent shaped chamber 11b will interrupt rotation of the rotor 12 inasmuch as the fluid being incompressible will preclude compression by operation of the pump. A valve 28 is provided for controlling flow of fluid through the crescent shaped chamber 11b, it being obvious that the valve is received in an opening in a constricted portion of the crescent shaped chamber and that the opening is closed by a threaded plug 29 essentially as shown in Fig. 1. The shank of the valve extends outwardly through an opening provided in a wall of the chamber and carries on its extreme end portion a crank 30 pivoted to a connector rod 31 which carries on its end a ball 32 received in a socket 33 formed on a portion of the piston head 34 which is slidingly mounted within a cylinder 35. A spring 34a within the cylinder 35 normally presses the piston 34 against the closed end of the cylinder whereby the valve 28 normally is maintained in opened position. A fluid transmission line 36 communicating with the interior of the cylinder 35 serves to initiate movement of the piston within the cylinder, for this purpose the line being connected to an appropriate source of hydraulic power, or if preferred, to a source of pneumatic fluid. From the foregoing it will be evident that when fluid is forced into the chamber of the cylinder 36, the piston 34 will be moved in a direction away from the closed end of the chamber, thereby causing the valve 28 to be moved into closed position, thus precluding or at least inhibiting rotation of the rotor 12 within the casing.

A tapped opening 40 near the bottom of the casing 11 is provided for facilitating introduction of hydraulic fluid to the pumping chamber. A check valve 41 mounted in a bushing 42 is received within the opening 40 and is arranged whereby passage of fluid through the check valve from the pumping chamber is precluded. The check valve communicates with the interior of a storage cylinder 42 which is provided with a piston 43 pressed by a spring 44 held by a cap 45 whereby fluid from the chamber 42 is urged through the check valve 41 into the pumping chamber. Fluid is introduced into the chamber 42 through a check valve 46, the valve being arranged whereby passage of fluid from the interior of the chamber through the valve is precluded. It will be apparent that the pumping chamber can be filled by connecting the check valve 46 with a suitable source of fluid under pressure.

Having described the structural features of the novel device according to the present invention, its mode of operation now will be pointed out, reference again being made to the accompanying drawings for a clearer understanding of the invention. During such time as the braking system is not in use, the shaft or axle 14 rotates freely carrying with it a rotor 12 whereby the vanes 15 spring urged against the bore of the pumping chamber 11c move fluid through the pumping chamber and openings 11d causing the same to pass from tip to tip of the crescent shaped chamber 11b. When it is desired to exert braking action upon the shaft, the valve 28 is closed by forcing fluid through the pipe or conduit 36 into the interior of the cylinder 35, thereby moving the piston 34. When transfer of fluid through the crescent shaped chamber 11b is prevented by closing of the valve 28, the brake operates and further rotation of the rotor is prevented. When it is desired to relieve the braking action, the pressure exerted on the fluid within the chamber 35 is released, thereby permitting the spring 34a to return the piston to initial position. The mode of filling the pumping chamber 11c has been above related and comprises connecting the check valve 46 with a source of fluid under pressure. It will be evident of course that when the pumping chamber is substantially completely filled with fluid the piston 43 in the chamber 42 will move against the pressure of the spring 43 and accordingly fluid in the chamber 42 will be maintained under pressure to compensate for possible leakage of fluid from the pumping chamber. Under these circumstances a supply of fluid under pressure is constantly available to complement the fluid in the pumping chamber maintaining the same filled at all times during use.

It is to be understood of course that this invention is capable of extended application and is not confined to the precise illustrated forms nor described construction and, therefore, such changes and modifications may be made therein as do not affect the spirit of the invention nor exceed the scope of the appended claims.

Having thus described the present invention, what it is desired to secure by Letters Patent is:

1. In a braking system, a brake element of the rotary pump type comprising a rotor eccentrically mounted within a casing, the space between the casing sides, the periphery of the rotor and the casing bore constituting a pumping chamber; the improved casing compensating for wear, wherein the rotor is continuously pressed between the casing sides, comprising a relatively flat cupular first casing element within which the rotor is received, the inner peripheral parts of said first casing element being threaded and being provided with key ways extending transversely of the threading; a disc-like second casing element freely axially slidable within the threaded portion of said first casing element and having radially extending formations engaging with said key ways; an externally threaded annulus, superposed on said second casing element, received in and engaging with the threaded parts of said first casing element whereby rotation of said annulus can press said second casing element within said first casing element; and continuously operating means tending to rotate said annulus comprising spring tensioning elements mounted on said second casing element attached to said annulus.

2. In a braking system, a brake element of the rotary pump type comprising a rotor eccentrically mounted within a casing, the space between the casing sides, the periphery of the rotor and the casing bore constituting a pumping chamber having an inlet and an outlet orifice; radially extending spring pressed sliding vanes carried by said rotor extending through said chamber and engaging the bore of said casing; a valve connecting and controlling fluid flow between said inlet and said outlet orifice; a remotely controlled hydraulic motor for closing said valve preventing rotation of said rotor; the improved casing compensating for wear, wherein the rotor is continuously pressed between the casing sides, comprising a relatively flat cupular first casing element within which the rotor is received, the inner peripheral parts of said first casing element being threaded and being provided with key ways extending transversely of the threading; a disc-like second casing element freely axially slidable within the threaded portion of said first casing element and having radially extending formations engaging with said key ways; an externally threaded annulus, superposed on said second casing element, received in and engaging with the threaded parts of said first casing element whereby rotation of said annulus can press said second casing element within said first casing element; and continuously operating means tending to rotate said annulus comprising spring tensioning elements mounted on said second casing element attached to said annulus.

3. In a braking system, a brake element of the rotary pump type comprising a rotor mounted within a casing, the space between the casing sides, the periphery of the rotor and the casing bore constituting a pumping chamber; the improved casing compensating for wear, wherein the rotor is continuously pressed between the casing sides, comprising a cupular first casing element within which the rotor is received, a second casing element freely axially slidable within said first casing element; an annulus, superposed on said second casing element, engaging with parts of said first casing element whereby rotation of said annulus can press said second casing element within said first casing element; and continuously operating means tending to rotate said annulus.

4. In a braking system, a brake element of the rotary pump type comprising a rotor mounted within a casing, the space between the casing sides, the periphery of the rotor and the casing bore constituting a pumping chamber having an inlet and an outlet orifice; radially extending sliding vanes carried by said rotor extending through said chamber and engaging the bore of said casing; a valve connecting and controlling fluid flow between said inlet and said outlet orifice; the improved casing compensating for wear, wherein the rotor is continuously pressed between the casing sides, comprising a cupular first casing element within which the rotor is received, a second casing element freely axially slidable within said first casing element; an externally threaded annulus, superposed on said second casing element, engaging with parts of said first casing element whereby rotation of said annulus can press said second casing element within said first casing element; and continuously operating means tending to rotate said annulus.

5. In a machine of the hydraulic pump type comprising a rotor mounted between relatively movable side elements of a casing in a manner such that the periphery of the rotor, the casing sides and casing bore define a pumping chamber, the improvement which comprises means for advancing one of the casing side elements toward the opposing side element causing the rotor to be pressed therebetween, said means comprising a movable member engaging with parts of both casing side elements in a manner such that movement of said member causes said side elements to approach each other, and spring tensioning means tending so to move said member.

FRIEDRICH H. HOLZ.